Jan. 20, 1931.    T. I. POTTER    1,789,497
PACKING
Filed March 22, 1927
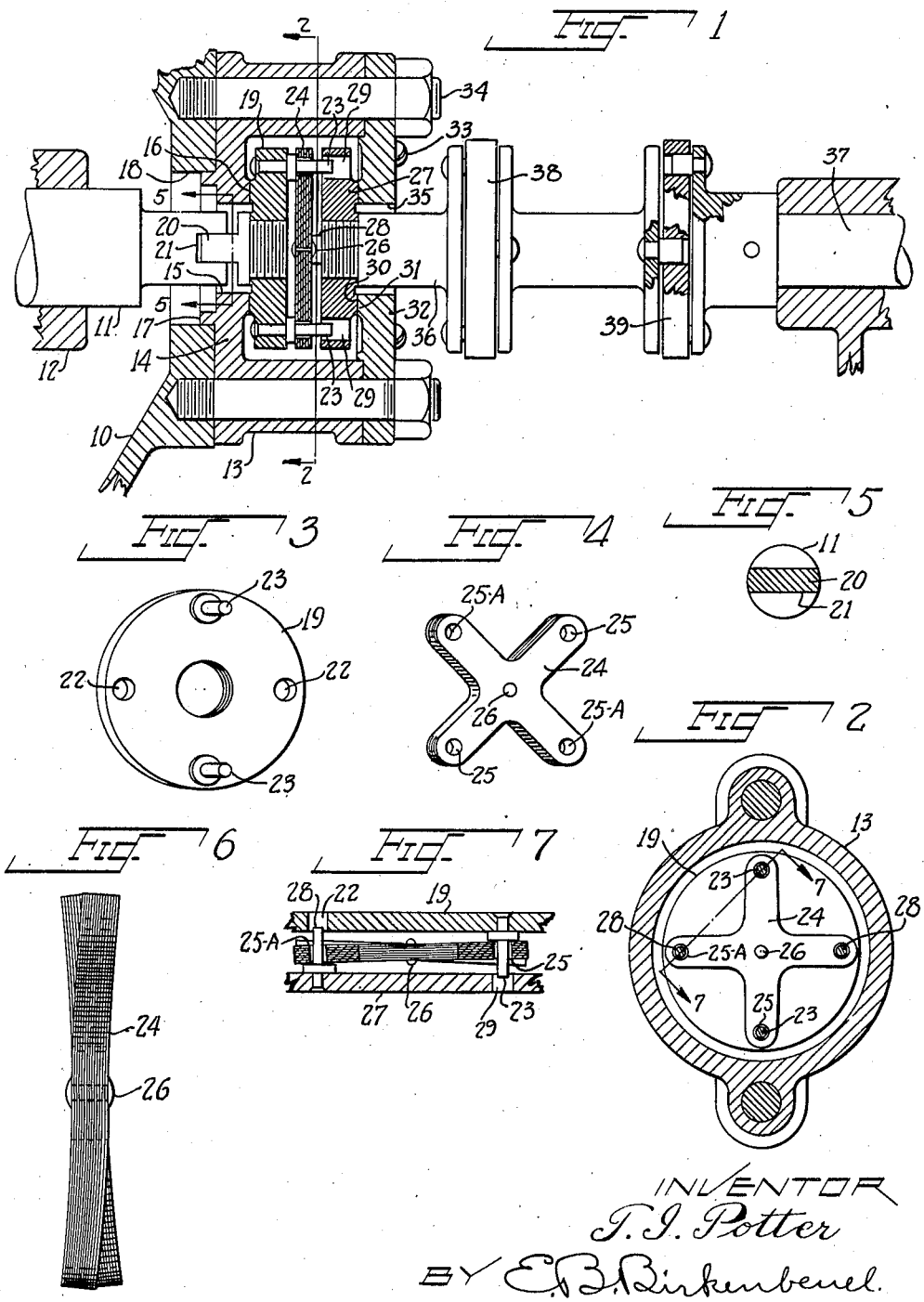
INVENTOR
T. I. Potter
BY E. B. Birkenbeuel.
ATTORNEY Patented Jan. 20, 1931

1,789,497

UNITED STATES PATENT OFFICE

THOMAS I. POTTER, OF PORTLAND, OREGON

PACKING

Application filed March 22, 1927. Serial No. 177,282.

This invention relates generally to the art of refrigeration, and especially to a packing for compressor shafts.

The main object of this invention is to provide a packing for compressor shafts which will prevent lubricant and refrigerant from leaking out around the shaft due to pressure within the crank case and to attain this object without causing undue friction.

The second object is to make a packing which will not be affected by errors in alignment between the compressor shaft and the drive element including either angular or offset mis-alignments.

The third object is to divide the shaft where it enters the compressor and to interpose the packing between the shaft ends.

The fourth object is to provide a packing which will seat itself with a force proportional to the crank case pressure—that is—the higher the crank case pressure the more firmly the packing will be held to its seat, and also to permit the addition of several stages of packing when occasion demands.

These, and other objects, will become more apparent from the specification fol'owing as illustrated in the accompanying drawing, in which:

Figure 1 is a longitudinal section through the packing showing a portion of the compressor and its shaft, as well as the end of the drive motor shaft and universal joints. Figure 2 is a transverse section taken along the line 2—2 in Figure 1. Figure 3 is an end elevation of a seat disk. Figure 4 is a perspective view of a laminated spring between the said disks. Figure 5 is a transverse section taken along the line 5—5 in Figure 1. Figure 6 is a side elevation of the spring Figure 7 is a section taken along the line 7—7 in Figure 2.

Similar numbers of reference refer to similar parts throughout the several views.

Referring in detail to the drawing, the packing about to be described is used to prevent oil and refrigerant from escaping from the compressor case 10 around the compressor shaft 11 which journals in the bearing 12. To the case 10 is attached a housing 13 whose side 14 is provided with a central opening 15 around which is formed a seat 16 on the side away from the compressor. The opposite side of the member 14 is provided with a flange 17 which fits into the opening 18 in the compressor case 10.

Against the side 16 is placed the first seat disk 19 into which is threaded a T ended plug 20 which fits rather loosely into the slot 21 in the shaft 11. The said disk 19 is provided with two holes 22 and two shouldered pins 23.

A cross shaped laminated spring 24 is provided with the holes 25 and 25—A and for convenience is held together with a central rivet 26. Two holes 25 in the spring 24 receive the pins 23. An initial bend or seat is placed in the spring 24, as indicated.

The second seat disk 27 is like the disk 19 and has the pins 28 projecting through the spring holes 25—A and into the seat disk holes 22; whereas the pins 23 project from the spring holes 25 into the hole 29 in the disk 27. The disk 27 is provided with a seat 30 which engages the seat 31 of the cover plate 32 which is held in place by the screws 33 and the entire packing and housing 13 is held in place against the compressor case 10 by stud bolts 34.

Through the central opening 35 in the cover plate 32 is passed the shaft 36 which is threaded into the seat disk 27. The shaft 36 is connected to the motor shaft 37 by the two universal joints 38 and 39 which permit actual off-setting of the motor shaft 37 and the compressor shaft 11, as well as angular misalignment.

In operation the spring 24 is bent to provide initial tension to urge the seat disks 19 and 27 apart and toward their respective seats at all times. Any pressure within the compressor case 10 sufficient to unseat the first disk 19 causes a pressure to be built up within the housing 13 which urges the disks more firmly toward their seats, due to the fact that more affective areas of the disks are on their inner sides.

The first disk 19 has compressor pressure on its smaller outer area, and the pressure within the housing against its larger inner area, plus the pressure of the spring 24. The disk 27 has atmospheric pressure on its smaller outer area and the housing pressure against its larger inner side, plus the force of the spring 24.

While it is essential with all types of packing to secure sufficient leakage to properly lubricate same, it is often necessary to so severely tighten the packing in order to reduce this leakage that the friction and heat developed thereby is very objectionable.

With my packing, however, when built approximately after the proportions illustrated, the greatest difficulty was to secure sufficient leakage to properly lubricate the seats and no objectionable friction or heating was developed.

It can be seen that if no provision is made for errors in shaft alignment, which are bound to be present in a degree, which would seriously affect the seating of the packing parts, the device would not function properly.

I claim:

1. A packing comprising a housing having seats formed within opposite ends thereof coaxial with each other, a disk seated over each of said seats, a universal driving connection between said disks having spring means for urging said disks toward their seats on opposite sides of their axes, and a universal driving connection on the outer side of each of said disks.

2. A seal for refrigerating machines comprising a housing having an opening therethrough for the reception of a shaft without contacting same, seats formed within said housing around said openings and facing each other in parallel spaced relationship, a disk revolvably mounted over each of said openings engaging said seats, a cross shaped laminated frame having an assembling rivet passing through the center of same and having openings formed in the ends thereof, and pins mounted in said disks freely occupying said openings for the purpose of transmitting motion between said disks without disturbing the seating thereof.

3. In a refrigerating machine the combination of a housing having one removable end and one fixed end, said removable and fixed ends having coaxial openings formed therein adapted to freely receive the ends of driving and driven shafts, a disk seated against the inner side of each opening, a cross shaped spring between said disks, shouldered pins mounted in said disks on opposite sides of the center thereof on which said frame is mounted, said shoulders forming means for holding said spring out of engagement with said disk, said spring transmitting rotary motion between said disks and exerting a longitudinal pressure between said disks on opposite sides of the axes thereof.

THOMAS I. POTTER.